(12) United States Patent
Morrison, III et al.

(10) Patent No.: US 11,020,653 B2
(45) Date of Patent: *Jun. 1, 2021

(54) PRESENTING DIGITAL CONTENT ITEM WITH TIERED FUNCTIONALITY

(71) Applicant: Microsoft Technology Licensing, LLC, Redmond, WA (US)

(72) Inventors: Frank R. Morrison, III, Seattle, WA (US); Brandon Hunt, Redmond, WA (US); Jeffrey David Henshaw, Redmond, WA (US); Michael Gallop, Sammamish, WA (US); Ivan P. Trindev, Issaquah, WA (US); Eric Neil Lockard, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,753

(22) Filed: Jul. 16, 2019

(65) Prior Publication Data

US 2019/0336854 A1    Nov. 7, 2019

Related U.S. Application Data

(63) Continuation of application No. 13/715,913, filed on Dec. 14, 2012, now Pat. No. 10,391,387.

(51) Int. Cl.
*A63F 13/45* (2014.01)
*A63F 13/30* (2014.01)
(Continued)

(52) U.S. Cl.
CPC .............. *A63F 13/12* (2013.01); *A63F 13/31* (2014.09); *A63F 13/352* (2014.09); *A63F 13/45* (2014.09);
(Continued)

(58) Field of Classification Search
CPC .............. G06F 3/0482; G06F 3/04815; G06F 3/04817; H04L 2300/552; A63F 2300/407; A63F 13/12
See application file for complete search history.

(56) References Cited

U.S. PATENT DOCUMENTS

| 2003/0090571 A1* | 5/2003 | Scheurich | ............ H04N 5/4448 348/207.1 |
| 2004/0210830 A1* | 10/2004 | Cote | ..................... G06F 3/0227 715/205 |

(Continued)

FOREIGN PATENT DOCUMENTS

| KR | 20070005543 A | 1/2007 |
| KR | 20070104178 A | 10/2007 |

(Continued)

OTHER PUBLICATIONS

"Office Action Issued in Indian Patent Application No. 3387/CHENP/2015", dated Jul. 12, 2019, 6 Pages.

(Continued)

*Primary Examiner* — Steve Rowland
(74) *Attorney, Agent, or Firm* — Alleman Hall Creasman & Tuttle LLP (57) ABSTRACT

Acquiring an interactive digital content item including a plurality of content portions includes receiving a first set of the content portions that is less than an entirety of the content portions. A partial functionality version of the interactive digital content item is presented using the first set of content portions. A second set of the content portions is received while the partial functionality version of the interactive digital content item is presented. Functionality is added to the partial functionality version of the interactive digital content item using the second set of content portions (Continued)

without interrupting presentation of the partial functionality version of the interactive digital content item.

20 Claims, 3 Drawing Sheets (51) Int. Cl.
    *A63F 13/31*     (2014.01)
    *A63F 13/352*     (2014.01)

(52) U.S. Cl.
    CPC ....... *A63F 2300/40* (2013.01); *A63F 2300/55* (2013.01); *A63F 2300/609* (2013.01); *A63F 2300/632* (2013.01)

(56) References Cited

U.S. PATENT DOCUMENTS

| | | | |
|---|---|---|---|
| 2007/0002119 A1 | 1/2007 | Abrott | |
| 2007/0136268 A1* | 6/2007 | Qureshi | G06F 16/958 |
| 2009/0062007 A1* | 3/2009 | Chihaya | A63F 13/12 |
| | | | 463/42 |
| 2011/0119615 A1* | 5/2011 | Cisler | G06F 9/451 |
| | | | 715/772 |
| 2011/0304625 A1* | 12/2011 | Gerhard | G06T 11/00 |
| | | | 345/428 |
| 2012/0159435 A1* | 6/2012 | Driesen | G06F 9/541 |
| | | | 717/120 |
| 2013/0151937 A1* | 6/2013 | Weber | G06F 16/9574 |
| | | | 715/207 |
| 2013/0185633 A1* | 7/2013 | Bunker | G06F 40/106 |
| | | | 715/246 |

FOREIGN PATENT DOCUMENTS

| | | |
|---|---|---|
| KR | 20080032183 A | 4/2008 |
| KR | 20080103535 A | 11/2008 |

OTHER PUBLICATIONS

"Office Action Issued in Korean Patent Application No. 10-2015-7015714", dated Apr. 6, 2020, 15 Pages.

Tae, et al., "Monitoring System for Distributed Document Management based on P2P", In Journal of Korea Information Science Society Workshop Presentation File, vol. 39, No. 2A, Nov. 2012, pp. 166-168.

"Office Action Issued in Canadian Patent Application No. 2,889,628", dated Oct. 11, 2019, 04 Pages.

"Office Action Issued in Korean Patent Application No. 10-2015-7018114", dated Apr. 6, 2020, 10 Pages.

"Office Action Issued in European Patent Application No. 13814337.5", dated Apr. 23, 2020, 4 Pages.

"Office Action Issued in Brazilian Patent Application No. BR112015011692-2", dated Jul. 1, 2020, 5 Pages.

"Office Action Issued in Korean Patent Application No. 10-2015-7018114", dated Oct. 29, 2020, 8 Pages.

* cited by examiner

PRESENTING DIGITAL CONTENT ITEM WITH TIERED FUNCTIONALITY

CROSS REFERENCE TO RELATED APPLICATIONS

This application is a continuation of U.S. patent application Ser. No. 13/715,913, filed Dec. 14, 2012, the entire contents of which is hereby incorporated herein by reference for all purposes.

BACKGROUND

Typical interactive digital content items, such as video games, comprise a plurality of content portions defining a game engine, models, textures, sound, levels, and the like. Although a small subset of the content portions are typically needed to begin interacting with such content items, interaction with digital content items is typically prohibited until the entire content item is installed onto local storage.

SUMMARY

Embodiments are disclosed for acquiring an interactive digital content item including a plurality of content portions. One example embodiment provides a method comprising receiving a first set of the content portions, the first set including less than an entirety of the content portions, and presenting a partial functionality version of the interactive digital content item using the first set of content portions. The method further comprises receiving a second set of the content portions while the partial functionality version of the interactive digital content item is presented, and adding functionality to the partial functionality version of the interactive digital content item using the second set of content portions without interrupting presentation of the partial functionality version of the interactive digital content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Typical interactive digital content items, such as video games, comprise a plurality of content portions defining game engines, models, textures, sound, levels, and the like. In typical use case scenarios, it may be expected that the entirety of a digital content item is installed on, or otherwise transferred to, a local storage machine before interaction with the digital content item is allowed. However, the amount of data needed to commence interaction with a particular content item (e.g., game engine, user-controlled character and a few weapons of a combat video game) is provided by a relatively small amount of the overall content item data. Accordingly, it will be appreciated that it may be desirable to preferentially acquire content portions usable to commence interaction with a digital content item such that a user is able to begin interacting with the digital content item as quickly as possible. For example, in a level-based video game, it may be desirable to acquire content portion(s) corresponding to a first level before acquiring additional content portions.

It will be further appreciated that interaction with a particular interactive digital content item may potentially be provided even faster by initially providing a partial functionality version of the digital content item and progressively adding additional functionality as additional content portion(s) are received. For example, continuing with the level-based video game example, a "white room" environment including a user-controlled character may be provided near-instantaneously, while additional functionality (e.g., scenery, sounds, enemy characters, weapons, etc.) are progressively added until a full functionality version of the digital content item is presentable. In this way, by providing a "tiered" user experience, a user of such a digital content item may be able to interact with the digital content item during installation, thereby immersing the user in the digital content item quicker and potentially increasing a likelihood that the user will continue to interact with the digital content item in the future.

Accordingly, embodiments are disclosed herein that relate to acquiring a digital content item by presenting a partial functionality version of the digital content item and progressively adding functionality until sufficient content portions have been received for providing a full functionality version of the digital content item.

Figure 1:
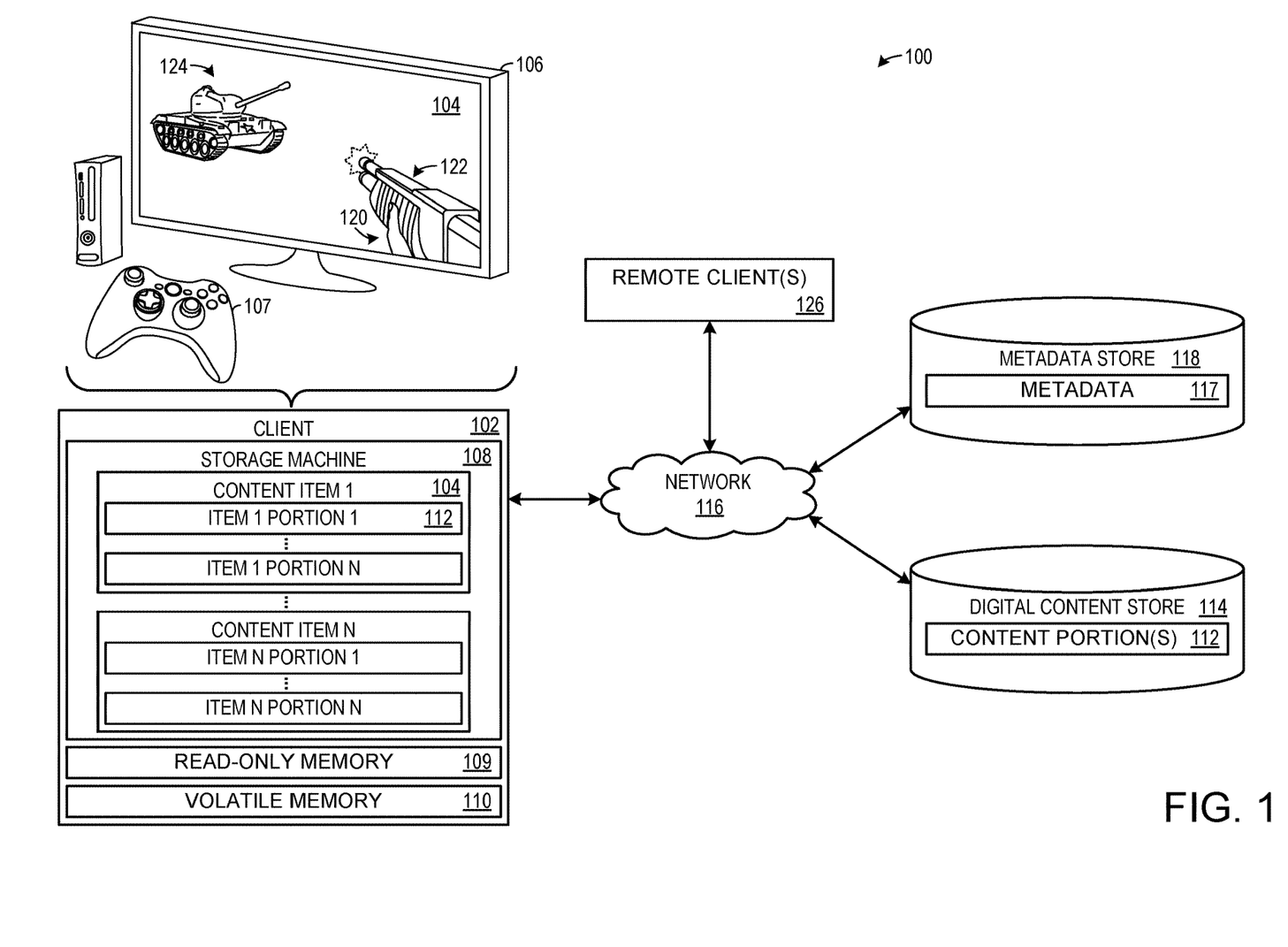
FIG. 1 shows an example use environment for acquiring a digital content item.

An example embodiment of a use environment 100 is described with reference to FIG. 1. Environment 100 includes client 102 (e.g., gaming device, media device, etc.) configured to present digital content item 104. For example, digital content item 104 may be displayed via display device 106 and controlled via input device 107 in some embodiments. Although illustrated as discrete devices, display device 106 and input device 107 may be at least partially incorporated in other embodiments (e.g., handheld device scenarios). It will be appreciated that the configuration of client 102 is presented for the purpose of example, and is not intended to be limiting in any manner.

Client 102 further comprises non-volatile storage machine 108 (e.g., hard drive, solid state memory, etc.) and volatile memory 110 (e.g., Random Access Memory "RAM"). In some embodiments, client 102 may optionally include read-only memory 109 (e.g., optical disc). Storage machine 108 may be configured for long-term storage of one or more digital content items 104, illustrated as an arbitrary number N of digital content items 104. Each digital content item comprises a plurality of content portions 112, illustrated as an arbitrary number N of content portions 112 for each content item 104. Although each digital content item is illustrated as comprising N number of content portions, it will be understood that each digital content item 104 may comprise any one or more content portions 112.

Generally speaking, client 102 may be configured to present digital content item 104 by dynamically acquiring content portion(s) 112, loading the content portions onto storage machine 108 and potentially buffering the content portions via volatile memory 110. Storage machine 108 may provide relatively fast access to content portion(s) 112 of digital content items 104, and it may therefore be desirable to ensure that the content are stored on the storage machine. In other words, it may be desirable to "install" content items onto the storage machine in order to provide potentially faster access of the content items.

Although the discussion herein is directed to a combat-style video game, it will be understood that each digital content item 104 may represent any suitable type of digital content, including but not limited to interactive content such as video games, interactive video, and social media. Other examples include, but are not limited to, movies, television shows and other videos, music, photo libraries, etc. Likewise, content portions 112 may take any suitable form. For example, content portions 112 may take the form of specific portions of memory (e.g. memory locations, disk sectors, etc.), or, by extension, specific data, files, etc.

In some scenarios, content portions 112 of digital content item 104 may be acquired from read-only memory 109 (e.g., optical disc) and loaded onto the storage machine. In other scenarios, client 102 may be in communication with one or more digital content stores 114 (e.g. locations from which content portion(s) 112 may be acquired) via network 116 (e.g. computer network, cellular phone network, and/or any other suitable type of network) configured to store one or more content portions 112 for one or one or more digital content items 104. While described in the context of a client-server environment, it will be understood that other embodiments may utilize any other suitable architecture, including, but not limited to, a peer-to-peer configuration. It will be appreciated that the configuration of environment 100 is provided for the purpose of example, and is not intended to be limiting in any manner.

Regardless of the location from which the content portion(s) 112 are acquired, the content portion(s) are loaded onto storage machine 108 in order to effect presentation of the corresponding digital content item 104. As mentioned above, in typical scenarios, an entirety of the content portions are loaded onto the storage machine before interaction with the content item is enabled. However, as content items increase in size, such loading may utilize an unsuitable amount of time, thereby increasing the barrier of entry and potentially preventing use of the digital content item.

Accordingly, client 102 may be configured to load a set of content portion(s) usable to provide partial (e.g., "bare-bones") functionality version of digital content item 104 prior to loading additional content portion(s) 112. As one non-limiting example, content portion(s) 112 describing user-controlled character 120 and user-controlled weapon 122 may be loaded before content portion(s) describing additional functionality (e.g., enemy vehicle 124, scenery, ambient sounds, 3D effects, etc.) are acquired. It will be appreciated that the term "character" is used herein to refer to any user-controlled entity (e.g., vehicle, humanoid, etc.), and is not intended to be limiting in any manner. An example use scenario for providing a tiered experience by progressively adding functionality will be described in detail below with reference to FIGS. 2A-2C.

Generally speaking, initially providing a partial functionality version of the digital content item and gradually providing a fuller functionality version may allow users to begin interacting with the content item almost immediately, albeit in a potentially limited manner. For example, in a world-based video game, the partial functionality version of the video game may include a virtual world of limited size and/or functionality (e.g., lacking scenery, etc.), a user-controlled character, and/or a few user-controlled items (e.g., weapons, vehicles, etc.). As another example, a partial functionality version of a combat video game may include a white room with a dummy target, thereby providing an opportunity for a user to become acquainted with various weapons provided by the video game. Such scenarios may thus enable the users to begin experimenting with interactive content item, thereby providing an introduction to the content item, while additional content portions 112 are being acquired.

As additional content portions are progressively acquired, additional functionalities described by the additional content portions are progressively added to the partial version of the content item. For example, continuing with the example video game, vehicles, weapons, etc. not described by the initial set of content portions may appear within the virtual environment as corresponding content portion(s) are acquired. Similarly, the virtual environment itself may receive additional functionality (e.g., increased size, added scenery, etc.) as corresponding content portions are received. In some embodiments, the additional functionality may include an increase in number and/or quality of textures, models, etc. usable to present a particular visual element. In other words, the visual element may be initially provided with a partial set of textures, a model of decreased complexity, etc., and the visual "quality" of such elements may be subsequently increased (e.g., improved texture fidelity, smoothed model, etc.) as additional content portions are received.

Although primarily described with reference to visual elements of a virtual environment, it will be appreciated that the term "functionality" is not limited to such. For example, in some embodiments, a partial functionality version of one or more sounds (e.g., lower-resolution ambient music, sound effects, etc.) and/or other virtual elements may be initially provided, and the resolution, bit rate, etc. may be progressively increased as additional content portions are received. Such scenarios are presented for the purpose of example, and are not intended to be limiting in any manner.

In some embodiments, the partial functionality version of a virtual game element may include a "placeholder" (e.g., text, 2D models, outlines, etc.) alerting the user to a size, description, position, etc. of a full functionality version of the virtual game element. In the example combat video game, locations where additional weapons will be available may be indicated with an outline until the describing content portion(s) are fully acquired, for example. It will be appreciated that these scenarios are presented for the purpose of example and are not intended to be limiting in any manner.

It will be further appreciated that in order to present a partial functionality version of a digital content item and to progressively add functionality thereto, it may be desirable to understand what virtual element(s) are represented by any one or more particular content portions 112. For example, a provider (e.g., publisher, developer, etc.) of each digital content item 104 may specify an order in which content portion(s) 112 are to be installed in some embodiments. In other embodiments, functionality may be added based on a comparison with predefined byte range information. In other words, one or more mapping mechanisms may be configured to determine what one or more virtual elements correspond to a given byte range of the content portions. As mentioned above, each content portion 112 may take the form of specific portions of memory, specific data, files, etc., and it will therefore be appreciated that mapping between content portions 112 and virtual element(s) described thereby may be provided via mechanisms instead of, or in addition to, byte range comparisons without departing from the scope of the present disclosure.

In some embodiments, one or more digital content items 104 and/or portions 112 thereof may have associated descriptive metadata 117 that describes an identity, characteristic, and/or other property of the content portion(s). For example, in the case of a video game, such metadata may comprise information regarding an identity of one or more virtual objects (e.g. character/object identification, location/setting, etc.) represented, either partially or fully, by a particular content portion. The metadata also may comprise information regarding the digital content item as a whole (e.g. genre), and/or any other suitable information. As illustrated in FIG. 1, metadata 117 may be stored, for example, via network-accessible metadata store 118 and/or via read-only memory 109. However, it will be understood that metadata 117 may be stored in any suitable location, including with the corresponding content item and/or content portion(s), without departing from the scope of the present disclosure.

Although the description hereto has been provided with reference to a "single player" digital content item 104, it will be appreciated that functionality may be progressively added to a multiplayer interactive digital content item in some scenarios. As such, environment 100 further includes one or more remote clients 126 in communication with client 102 via network 116. In other embodiments, one or more clients 126 may be in communication with client 102 and/or other clients 126 via mechanism(s) other than network 116, including, but not limited to, peer-to-peer connections.

In multiplayer scenarios, a partial functionality version of the interactive digital content item may include a multiplayer environment comprising a subset of available user-controllable items, and additional functionality may be added in a similar manner to that described above with reference to single player content (e.g., via a "white room"). Additionally, any two or more devices of client 102 and remote clients 126 may be able to interact via corresponding partial functionality versions of the multiplayer game. In other words, multiplayer interaction may be provided between any two devices each presenting a partial functionality version of a multiplayer interactive digital content item.

It will be appreciated that although discussion hereto has been provided with reference to transitioning from a partial functionality of a particular user experience/environment to a full functionality version of the same user experience/environment, it will be appreciated that other configurations are possible without departing from the scope of the present disclosure.

For example, in some embodiments, a partial functionality version of a particular content item may include a pre-defined, "load-specific" user environment (e.g., environment configured for presentation during loading) that is presented for user interaction during loading of the additional content portions. Such a load-specific user environment may be initially presented at "full functionality," and the additional content portions may thus be acquired to progressively add functionality to other user environments not presently being accessed. As the additional environments and/or functionalities thereof are loaded, the user may be alerted of such progression (e.g., via overlay, menu system, alert sound, etc.), and the user may therefore be able to transition to the other environments either programmatically and/or according to user input(s). As one non-limiting example, in multiplayer digital content items, the load-specific user environment may include a multiplayer environment of reduced, in comparison to other "full functionality" environment(s) of the content item, size, visual and/or audio "quality," etc. The load-specific environment may be accessible via additional users and/or computing devices so that multiplayer interaction may be provided during loading of the additional content portions, thereby potentially decreasing the barrier to entry. Generally speaking, it will be appreciated that a partial functionality version may be provided for any suitable digital content item, and any additional functionality may be progressively added thereto, without departing from the scope of the present disclosure.

Figure 2A:
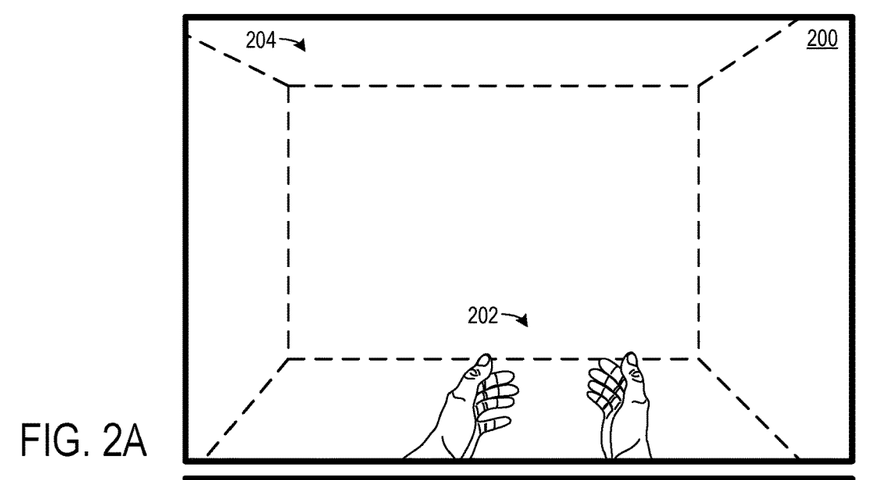
FIGS. 2A-2C show an example use scenario for acquiring and presenting a digital content item with tiered functionality.
Figure 2B:
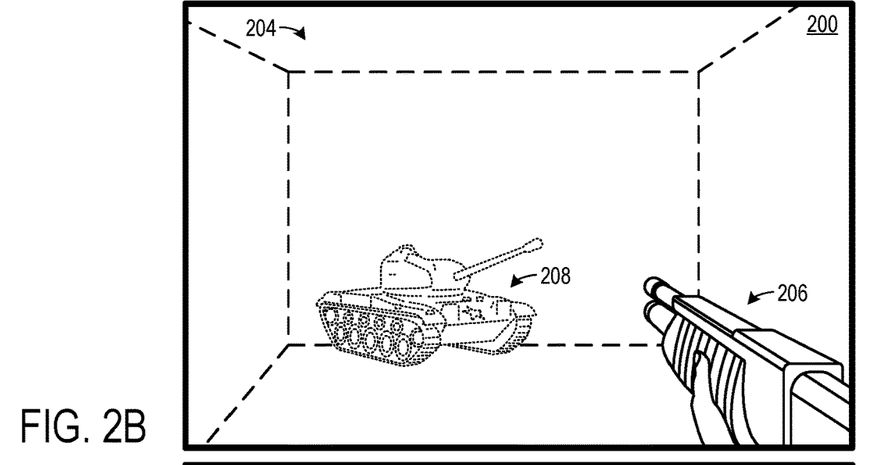
Figure 2C:
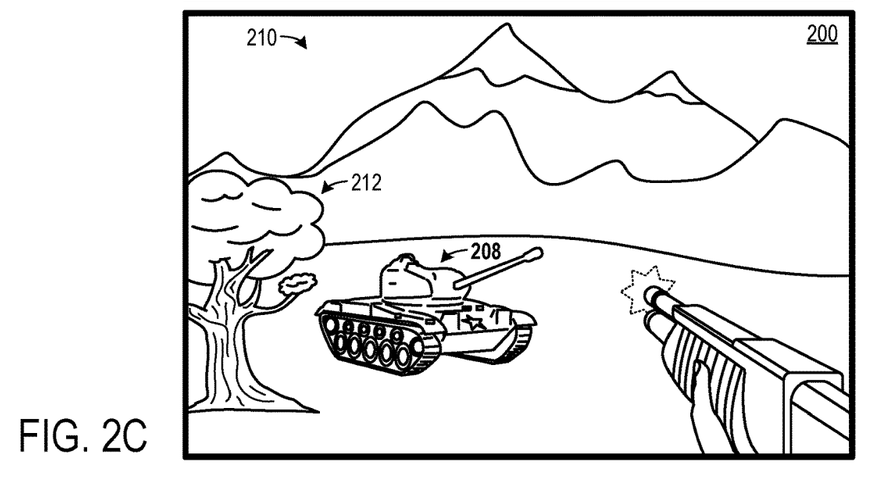

Turning now to FIGS. 2A-2C, an example use scenario for presenting an interactive digital content item 200 with tiered functionality in the form of a combat video game is shown. Specifically, FIG. 2A illustrates a partial functionality version of the digital content item including user-controlled character 202 located within virtual white room environment 204. As used herein, the terms "white room environment," "white room" and the like refer to any rendered virtual environment absent a substantial portion of additional virtual game elements (e.g., sounds, textures, etc.), and does not necessarily denote a color or other configuration (e.g., rectangular prism shape) of such an environment. For example, in other embodiments, the white room environment may include a substantially unbounded virtual environment comprising at least some of the additional game elements. It will be further understood that although the illustrated example of FIGS. 2A-2C comprises a first-person viewpoint, such a configuration is not intended to be limiting in any manner.

The depicted white room environment may enable the user to, for example, become acquainted with the physics, button configuration, speed, etc. of the video game. Such an environment may further enable, for example, adjustment of a user perspective and/or other user-specific customizations. It will be appreciated that such interaction is provided while additional functionality is being received and added, thereby providing interaction with the digital content item even prior to the content item being fully installed.

Turning now to FIG. 2B, the partial functionality version of digital content item 200 of FIG. 2A is illustrated as further comprising additional functionality added upon receipt of additional content portions. Specifically, the added functionality comprises virtual game elements 206 and 208, illustrated as a user-controlled weapon and an enemy vehicle, respectively. Generally speaking, the additional functionality may include, but is not limited to, levels, environments, maps, characters, items, and/or any other virtual element (e.g., menus, etc.).

As with the overall digital content item itself, it will be appreciated that the virtual game elements may be initially provided with partial functionality until sufficient content portion(s) are received to provide a full functionality version. In the case of element 206, a user may be able to switch between partial functionality versions of the weapons, but may not be able to fire the weapons until full functionality versions are provided. In other scenarios, as illustrated by the dashed outline of element 208, a partial functionality version of an in-game element may not be interactable, and may instead indicate a future position, shape, description, etc. of the corresponding virtual element(s). For example, in the case of 3D virtual elements, a partial functionality version of such an element may include a 2D version of the virtual element. Thus, upon receipt of additional content portion(s), the 2D version may progressively "hydrate" into the full-functionality, 3D version. It will be appreciated that these scenarios are presented for the purpose of example, and that a partial functionality version of a particular virtual game element may be provided, and transitioned from, according to various mechanisms without departing from the scope of the present disclosure. For example, as mentioned above, a partial functionality version of textures, models, sound effects, music, etc. may be initially provided, and increased functionality (e.g., improved "quality") may be subsequently provided as additional content portions are received. It will be understood that the additional functionality may be added without substantially interrupting presentation of the digital content item (e.g., without loading screens, etc.).

As additional content portions are received, additional functionality is progressively added to the digital content item until sufficient content portion(s) (e.g., an entirety of the content portions) have been received to provide a full functionality version the digital content item, as illustrated by FIG. 2C. For example, the white room environment is replaced with in-game environment 210 comprising element 212 (e.g., tree or other in-game element) and the user-controlled weapon becomes fully operational. Further, the full functionality version of the digital content item includes a full-functionality (e.g., 3D and interactive) version of enemy vehicle 208. At this point, interaction with digital content item 200 may continue ad infinitum, via one or more discrete game play sessions, until the digital content item is uninstalled.

Figure 3:
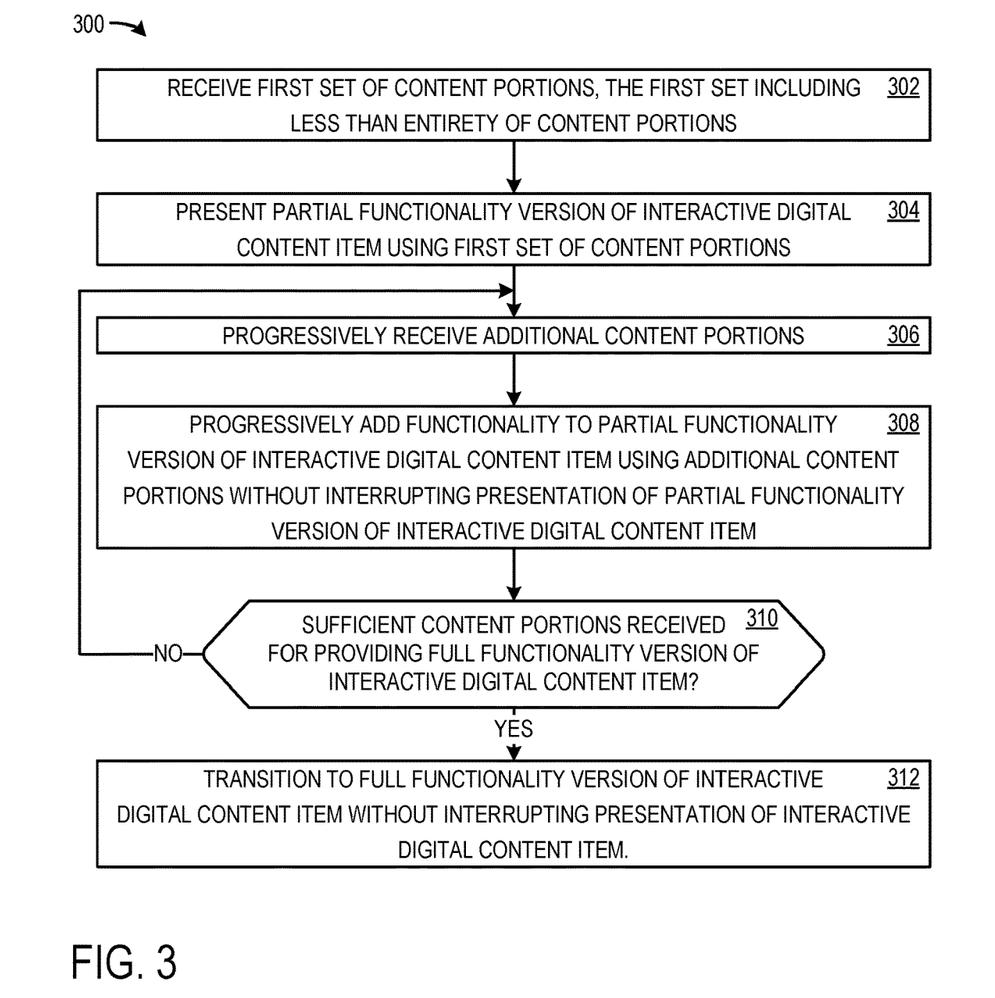
FIG. 3 shows a process flow depicting an example of a method for acquiring a digital content item according to an embodiment of the present disclosure.

Turning now to FIG. 3, an example of a method 300 for acquiring a digital content item comprising a plurality of content portions according to an embodiment of the present disclosure is shown. At 302, method 300 comprises receiving a first set of the content portions, where the first set includes less than an entirety of the content portions. In some embodiments, the content portions may be received according to one or more user inputs (e.g., via interaction with one or more graphical user interfaces), whereas the content portions may be programmatically acquired in other embodiments (e.g. automatic download upon game release, according to one or more recommendation mechanisms, etc.).

At 304, method 300 further comprises presenting a partial functionality version of the interactive digital content item using the first set of content portions. As mentioned above, the first set of content portions may include a predefined set of content portions defined by the developer, publisher, etc. In other embodiments, content portion(s) may be received and one or more mapping mechanisms may be usable to recognize the virtual game elements described by the content portions (e.g., via comparison with predefined byte range information). In other words, byte range information for each received content portion may be compared to predefined byte range information, and the partial functionality version of the interactive digital content item may be presented upon determining that the byte range(s) usable to provide the partial functionality version of the interactive digital content item have been received. In some embodiments, metadata (e.g., metadata 117) describing the content portion(s) may be used in recognizing what element(s) are described by the content portions, as mentioned above. Generally speaking, the partial functionality version of the video game may comprise a minimum amount of information usable to provide user-interaction (e.g., white room and a user-controlled character), though it will be appreciated that the partial functionality version of a digital content item may have any suitable configuration without departing from the scope of the present disclosure.

For example, as mentioned above, the partial functionality version of the digital content item may include a load-specific, full-functionality environment of the digital content item (e.g., multiplayer environment of relatively reduced size) configured to be presented during acquisition of the additional content portions. In other words, such a load-specific environment is initially presented with full functionality, and the additional content portions are acquired to progressively add functionality to the rest of the digital content item (e.g., functionality usable in environment(s) other than the load-specific environment). In contrast to other embodiments where a single environment is progressively filled-in with virtual elements (e.g., sounds, visuals, etc.) of increased quality and/or functionality, such a configuration may potentially decrease the barrier of entry for experiencing the digital content item without initially providing a user experience having, for example, reduced audio and/or image quality. Such a configuration may be desirable, for example, as lower quality visual and/or audio elements may impact the user experience of the digital content item, thereby potentially negatively impacting adoption of the digital content item.

Method 300 further comprises progressively receiving 306 additional content portions and progressively adding 308 functionality to the partial functionality version of the interactive digital content item using the additional content portions without interrupting presentation of the partial functionality version of the interactive digital content item. In other words, as described above, additional content portions are received (e.g., during interaction with the partial functionality version of the video game), and additional functionality provided by the additional content portions is thus progressively added. As described above, at least some of the additional functionality may include virtual game elements (e.g., scenery, enemy characters, etc.) for which a partial functionality version may be initially presented. That is, similar to the content items themselves, the constituent virtual elements may be progressively "filled-out" until sufficient content portion(s) have been received to subsequently provide full functionality versions of the virtual elements.

At 310, method 300 further comprises determining whether sufficient content portions have been received for providing a full functionality version of the digital content item. Such a determination may be effected, for example, according to provided metadata, predefined byte range information and/or other suitable mechanisms or combination of mechanisms without departing from the scope of the present disclosure. If sufficient content portions have not been received, method 300 returns to 306 where additional content portions may be received and additional functionality may be progressively added therefrom. However, if sufficient content portions have been received, method 300 continues to 312 where method 300 further comprises transitioning to the full functionality version of the interactive digital content item without interrupting presentation of the interactive digital content item. In this way, the partial functionality version of an interactive digital content item may be filled-out with additional functionality until all of the functionality of the full functionality version has been added. During such transitions, the functionality is added such that presentation of the digital content item is not interrupted.

Such a configuration may therefore enable interaction with the digital content item to begin as quickly as possible, and for the experience to be continuously expanded without interruption to the experience, thereby decreasing the barrier to entry while gradually providing a fuller functionality version of the digital content item.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
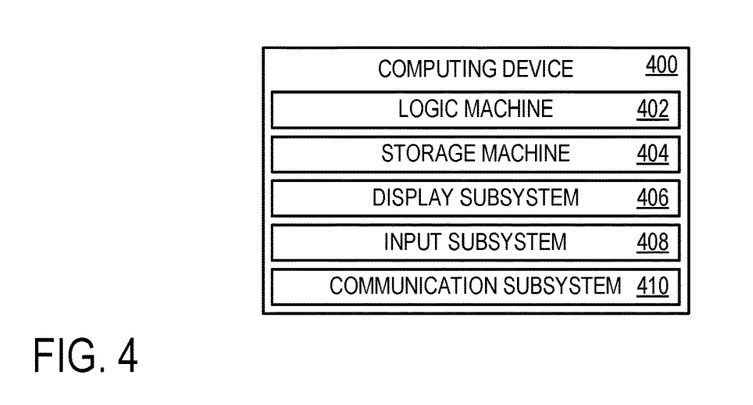
FIG. 4 schematically shows an example computing system according to an embodiment of the present disclosure.

FIG. 4 schematically shows a non-limiting embodiment of a computing system 400 that can enact one or more of the methods and processes described above. Computing system 400 is shown in simplified form. Client 102, remote clients 126 and digital content store 114 are non-limiting examples of computing system 400. Computing system 400 may take the form of one or more game consoles, personal computers, server computers, tablet computers, home-entertainment computers, network computing devices, mobile computing devices, mobile communication devices (e.g., smart phone), and/or other computing devices.

Computing system 400 includes logic machine 402 and storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of uploading a video game including a plurality of content portions, the method comprising:

sending a first set of the content portions from a server computing device to a client computing device, the first set including less than an entirety of the plurality of content portions, and the first set including content portions selected to begin a gameplay session by computer-executing a partial functionality version of the video game on the client computing device using the first set of the content portions before the entirety of the plurality of content portions are sent and while other of the plurality of content portions continue to be sent; and sending a second set of the content portions from the server computing device to the client computing device while the gameplay session continues and the partial functionality version of the video game continues computer-executing on the client computing device, and the second set of the content portions adds functionality to the partial functionality version of the video game while the gameplay session continues and the partial functionality version of the video game continues computer-executing on the client computing device.

2. The method of claim 1, further comprising:

until sufficient content portions are sent to the client computing device for providing a full functionality version of the video game, progressively sending additional content portions while the gameplay session continues, the additional content portions progressively adding functionality to the partial functionality version of the video game while the gameplay session continues and the partial functionality version of the video game continues computer-executing.

3. The method of claim 1, where the plurality of content portions is sent from the server computing device to the client computing device according to a provider specified order to computer-execute the partial functionality version of the video game on the client computing device.

4. The method of claim 1, where the first set of the content portions includes a game engine of the video game.

5. The method of claim 1, where the first set of the content portions includes a user-controlled character or entity of the video game.

6. The method of claim 5, where the partial functionality version of the video game comprises the user-controlled character or entity presented in a white room environment.

7. The method of claim 1, where functionality is added by initially presenting a virtual game element with a partial functionality and subsequently presenting the virtual game element with a full functionality.

8. The method of claim 7, where the virtual game element is a 3D virtual game element, and where computer-executing the virtual game element with the partial functionality includes computer-executing a 2D version of the 3D virtual game element.

9. The method of claim 1, where the partial functionality version of the video game includes a partial functionality multiplayer game.

10. The method of claim 9, where the first set of the content portions includes a multiplayer game engine of the video game.

11. The method of claim 1, where the first set of content portions includes a predefined set of content portions.

12. A server computing device, comprising:

a logic machine:

a storage machine configured to hold instructions executable by the logic machine to:

send a first set of content portions selected from a plurality of content portions included in a video game from the server computing device to a client computing device, the first set including less than an entirety of the plurality of content portions, and the first set including content portions selected to begin a gameplay session by computer-executing a partial functionality version of the video game on the client computing device using the first set of the content portions before the entirety of the plurality of content portions are sent and while other of the plurality of content portions continue to be sent; and send a second set of content portions selected from the plurality of content portions from the server computing device to the client computing device while the gameplay session continues and the partial functionality version of the video game continues computer-executing on the client computing device, and the second set of the content portions adds functionality to the partial functionality version of the video game while the gameplay session continues and the partial functionality version of the video game continues computer-executing on the client computing device.

13. The server computing device of claim 12, where the instructions are further executable to:

until sufficient content portions are sent to the client computing device for providing a full functionality version of the video game, progressively send additional content portions while the gameplay session continues, the additional content portions add functionality to the partial functionality version of the video game while the gameplay session continues and the partial functionality version of the video game continues computer executing.

14. The server computing device of claim 12, where the plurality of content portions is sent from the server computing device to the client computing device according to a provider specified order to computer-execute the partial functionality version of the video game on the client computing device.

15. The server computing device of claim 12, where the partial functionality version of the video game comprises a user-controlled character or entity presented in a white room environment.

16. The server computing device of claim 12, where the partial functionality version of the video game includes a full functionality version of a first virtual environment, where functionality is added by adding functionality to one or more virtual environments other than the first virtual environment.

17. The server computing device of claim 12, where the first set of the content portions includes a game engine of the video game.

18. A method of uploading a video game including a plurality of content portions, the method comprising:

sending a first set of the content portions from a server computing device to a client computing device according to a provider specified order selected to decrease a download waiting time before gameplay begins, the first set including less than an entirety of the plurality of content portions, and the first set including content portions selected to begin a gameplay session by computer-executing a partial functionality version of the video game on the client computing device using the first set of the content portions before the entirety of the plurality of content portions are sent and while other of the plurality of content portions continue to be sent; and sending a second set of the content portions from the server computing device to the client computing device according to the provider specified order while the gameplay session continues and the partial functionality version of the video game continues computer-executing on the client computing device, and the second set of the content portions adds functionality to the partial functionality version of the video game while the gameplay session continues and the partial functionality version of the video game continues computer-executing on the client computing device.

19. The method of claim 18, where the partial functionality version of the video game comprises a user-controlled character or entity presented in a white room environment.

20. The method of claim 18, where functionality is added by dynamically recognizing one or more virtual game elements at least partially described by the additional content portions based on a comparison with predefined byte range information, where each virtual game element not fully described by the additional content portions is presented with a partial functionality, and where each virtual element fully described by the additional content portions is presented with a full functionality.

* * * * *